(12) United States Patent
Yamane et al.

(10) Patent No.: US 11,123,804 B2
(45) Date of Patent: Sep. 21, 2021

(54) TOOL HOLDER FOR LATHE AND LATHE PROVIDED WITH THE TOOL HOLDER

(71) Applicant: DMG MORI CO., LTD., Nara (JP)

(72) Inventors: Masahiro Yamane, Nara (JP); Yohei Yamaguchi, Nara (JP); Toshikazu Okutani, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 16/107,130

(22) Filed: Aug. 21, 2018

(65) Prior Publication Data

US 2019/0118268 A1 Apr. 25, 2019

(30) Foreign Application Priority Data

Oct. 23, 2017 (JP) .............................. JP2017-204187

(51) Int. Cl.
| | |
|---|---|
| *B23B 7/04* | (2006.01) |
| *B23B 29/24* | (2006.01) |
| *B23B 29/26* | (2006.01) |
| *B23B 3/16* | (2006.01) |
| *B23Q 5/04* | (2006.01) |

(52) U.S. Cl.
CPC ............ *B23B 29/242* (2013.01); *B23B 3/162* (2013.01); *B23B 29/26* (2013.01); *B23Q 5/046* (2013.01); *B23B 2251/18* (2013.01); *B23B 2251/46* (2013.01)

(58) Field of Classification Search
CPC ............ B23B 2251/18; B23B 2251/46; B23B 29/242; B23B 29/26; B23B 3/162; B23B 29/24; B23B 3/30; B23Q 5/045; B23Q 2220/002; B23Q 39/02; B23Q 2039/004; B23Q 2039/008; B23P 23/02; Y10T 82/2508; Y10T 29/5114
USPC ........................................................ 29/27 C
See application file for complete search history.

(56) References Cited

U.S. PATENT DOCUMENTS

| | | | | |
|---|---|---|---|---|
| 3,972,212 A | * | 8/1976 | Brinkman ................ | B21H 7/14 72/102 |
| 4,062,255 A | * | 12/1977 | Perotti .................. | B23B 51/106 82/170 |

(Continued)

FOREIGN PATENT DOCUMENTS

| | | | | |
|---|---|---|---|---|
| EP | 1217481 A1 | * | 6/2002 | ........... G05B 19/404 |
| JP | S54128996 U | | 9/1979 | |

(Continued)

*Primary Examiner* — Sara Addisu
(74) *Attorney, Agent, or Firm* — von Briesen & Roper, s.c.

(57) ABSTRACT

A tool holder for a lathe having a spindle permits improved arrangement of tools on a turret to maximize the allowable workpiece outer diameter for a given tool. A Z-axis feed mechanism moves the spindle and the turret relative to each other in a Z-axis direction along a center axis of the spindle, while an X-axis feed mechanism moves the spindle and the turret relative to each other in an X-axis direction orthogonal to the Z-axis direction. A plurality of tool holders is attached to the turret, each having a tool holding part. At least one of the tool holders holds the tool at a holding position such that, when indexed to a machining position by rotation of the turret, a cutting-edge reference point of the tool is offset with respect to an X-Z plane including a center axis of the turret.

1 Claim, 7 Drawing Sheets

(56) References Cited

U.S. PATENT DOCUMENTS

| | | | | |
|---|---|---|---|---|
| 4,099,446 A * | 7/1978 | Harlin | ............... | B23Q 1/50 33/25.1 |
| 4,417,379 A * | 11/1983 | Goode | ............... | B23Q 1/54 29/35.5 |
| 4,888,865 A * | 12/1989 | Okada | ............... | B23B 31/1071 483/39 |
| 5,188,493 A * | 2/1993 | Heel | ............... | B23B 29/20 29/27 C |
| 6,453,782 B1 * | 9/2002 | Yamazaki | ............... | G05B 19/186 700/159 |
| 6,785,943 B2 * | 9/2004 | Sheehan | ............... | B23Q 16/102 29/40 |
| 7,089,838 B2 * | 8/2006 | Erickson | ............... | B23B 1/00 82/137 |
| 7,997,172 B2 * | 8/2011 | Hyatt | ............... | B23B 5/36 29/270 |
| 2003/0221525 A1 * | 12/2003 | Katoh | ............... | B23B 29/242 82/121 |
| 2004/0003690 A1 * | 1/2004 | Katoh | ............... | B23Q 5/045 82/121 |
| 2004/0029509 A1 * | 2/2004 | Paci | ............... | B23B 39/167 451/442 |
| 2005/0025589 A1 * | 2/2005 | Murai | ............... | B23Q 5/045 408/138 |
| 2005/0160887 A1 * | 7/2005 | Erickson | ............... | B23B 1/00 82/121 |
| 2010/0260563 A1 * | 10/2010 | Conroy | ............... | B23Q 5/046 408/60 |
| 2011/0067536 A1 * | 3/2011 | Erickson | ............... | B23B 29/046 82/160 |
| 2013/0036880 A1 * | 2/2013 | Roden | ............... | B23B 29/20 82/159 |
| 2013/0168118 A1 * | 7/2013 | Yamane | ............... | B23Q 5/04 173/29 |
| 2014/0196583 A1 * | 7/2014 | Judas | ............... | B23B 29/205 82/121 |
| 2019/0255670 A1 * | 8/2019 | Fautz | ............... | B23B 29/242 |

FOREIGN PATENT DOCUMENTS

| | | | |
|---|---|---|---|
| JP | S5695514 A | | 8/1981 |
| JP | 63057104 A | * | 3/1988 |
| JP | 63221907 A | * | 9/1988 |
| JP | H05-345202 A | | 12/1993 |
| JP | 2002205202 A | | 7/2002 |
| JP | 2007075922 A | | 3/2007 |

\* cited by examiner

TOOL HOLDER FOR LATHE AND LATHE PROVIDED WITH THE TOOL HOLDER

BACKGROUND

Field of the Disclosure

The present disclosure relates to a tool holder to be attached to a turret of a lathe, and also relates to a lathe having such a tool holder attached thereto.

Background of the Disclosure

A conventional typical lathe, as disclosed in Japanese Unexamined Patent Application Publication No. H5-345202, has a polygonal prismatic turret, and the turret has various types of tools attached thereto, such as a cutting tool for end surface machining and outer diameter machining, a cutting tool for inner diameter machining, a cutting tool for grooving, and rotary tools typified by a drill and an end mill. These tools are provided for corresponding machining operations.

Further, such a lathe is typically configured such that the turret and a spindle that holds a workpiece are moved relative to each other in a direction of a Z-axis that extends along a center axis of the spindle and in a direction of an X-axis that is orthogonal to the center axis of the spindle. The lathe may be further configured such that the turret and the spindle are movable relative to each other also in a direction of a Y-axis that is orthogonal to both the X-axis and the Z-axis. Through such relative movement, the workpiece held by the spindle is machined by a tool attached to the turret.

Each tool is attached to the turret via a tool holder. A fixed tool such as a cutting tool is attached to the turret such that, when the tool is indexed to a machining position by rotation of the turret, a cutting edge of the tool is positioned in an X-Z plane which includes a center axis of rotation of the turret, while a rotary tool is attached to the turret such that a center axis of the tool is positioned in the X-Z plane including the center axis of rotation of the turret.

A lathe having such a polygonal prismatic turret enables various types pf machining by attaching tools to tool attachment positions set on the turret. Further, such a lathe can machine various types of workpieces without performing set-up operations such as tool change, to the extent that the tools attached to the turret can machine.

SUMMARY OF THE DISCLOSURE

A maximum allowable workpiece outer diameter for a lathe is determined by the manufacturer of the lathe based on a maximum allowable load for a spindle motor and the like; however, the maximum allowable workpiece outer diameter is also restricted by overhangs of tools attached to the turret and arrangement of the tools. That is, when each tool is indexed to a machining position for machining, adjacent tools that are adjacent to the indexed tool can interfere with the workpiece; in such a case, the maximum allowable workpiece outer diameter becomes such that the workpiece does not interfere with the adjacent tools when the workpiece is machined by the indexed tool.

However, even when there are certain restrictions on tool overhang and arrangement of tools to be used and the maximum allowable workpiece outer diameter is restricted accordingly, if the maximum allowable workpiece outer diameter determined based on the tools is smaller than the maximum allowable workpiece outer diameter corresponding to machining ability of the lathe, there is a possibility that the maximum allowable workpiece outer diameter determined based on the tools can be enhanced by improving the conventionally ordinary tool arrangement on the turret. Further, this approach makes it possible to bring out potential machining ability of the lathe, and thereby enables efficient operation of the lathe.

The present disclosure has been achieved in view of the above-described circumstances, and an object thereof is to provide a tool holder for lathe which can enable an improved arrangement of tools on a turret to enhance a maximum allowable workpiece outer diameter determined based on tools, as well as a lathe provided with such a tool holder.

The present disclosure, for solving the above-described problem, relates to a tool holder having a tool holding part holding a tool, and configured to be attached to a turret of a lathe, the turret being configured to be movable at least in a direction of a Z-axis extending along a center axis of a spindle and in a direction of an X-axis orthogonal to the Z-axis, the tool holding part holding the tool at a holding position thereon set at a position such that, when the held tool is indexed to a machining position by rotation of the turret, a cutting-edge reference point of the held tool is offset to one side with respect to an X-Z plane including a center axis of the turret.

Further, the present disclosure relates to a lathe including a spindle, a turret, a Z-axis feed mechanism moving the spindle and the turret relative to each other in a direction of a Z-axis extending along a center axis of the spindle, an X-axis feed mechanism moving the spindle and the turret relative to each other in a direction of an X-axis orthogonal to the Z-axis, and a plurality of tool holders each having a tool holding part holding a tool, and attached to the turret, the tool holding part of at least one of the tool holders holding the tool at a holding position thereon set at a position such that, when the held tool is indexed to a machining position by rotation of the turret, a cutting-edge reference point of the held tool is offset to one side with respect to an X-Z plane including a center axis of the turret.

With the tool holder and lathe according to the present disclosure, when a tool held by the tool holder is indexed to a machining position by rotation of the turret, a cutting-edge reference point of the tool is positioned at a position offset to one side with respect to an X-Z plane including the center axis of the spindle. Note that the cutting-edge reference point means a site on a tip of the tool which performs a machining action. In a case of a fixed tool such as a cutting tool, the cutting-edge reference point thereof is a machining-action performing point on a cutting edge thereof. In a case of a rotary tool such as a drill or an end mill, the cutting-edge reference point thereof is a point of intersection of a center axis and a tip thereof. Further, in a case where two or more tools are held by one tool holder, the tools are held by the tool holder such that the cutting-edge reference points of all of them are offset to the one side.

In the present disclosure, the lathe may be implemented such that the turret has attached thereto at least two tool holders including a first tool holder and a second tool holder adjacent to the first tool holder at one side of the first tool holder, and the tool holding part of the second tool holder holds the tool at a holding position thereon set such that, when the held tool is indexed to the machining position, a cutting-edge reference point of the held tool is offset to the one side, that is, a side away from the first tool holder, with respect to the X-Z plane including the center axis of the turret.

In the thus-implemented lathe, when the tool held by the first tool holder (first tool) is indexed to the machining position, the cutting-edge reference point of the tool held by the second tool holder (second tool) is distant to the one side (offset side) from the machining position of the first tool, as compared with a case where the second tool is held by the conventional tool holder.

Thus, when the first tool is indexed to the machining position for machining, the second tool is positioned at a position distant from the workpiece, as compared with the case where the second tool is held by the conventional tool holder. Therefore, a maximum allowable workpiece outer diameter for machining using the first tool is larger than in the case where the second tool is held by the conventional tool holder. In other words, such implementation enables machining a workpiece having a larger diameter, which makes it possible to bring out inherent machining ability of the lathe, and thereby enables efficient operation of the lathe.

Further, the lathe according to the present disclosure may be implemented such that the turret has attached thereto at least three tool holders including a first tool holder, a second tool holder, and a third tool holder, the second and third tool holders being adjacent to the first tool holder respectively at both sides of the first tool holder, and the tool holding part of each of the second and third tool holders holds the tool at a holding position thereon set at a position such that, when the held tool is indexed to the machining position, a cutting-edge reference point of the held tool is offset to a side away from the first tool holder with respect to the X-Z plane including the center axis of rotation of the turret.

In the thus-implemented lathe, when the tool held by the first tool holder (first tool) is indexed to the machining position, the cutting-edge reference point of the tool held by the second tool holder (second tool) and the cutting-edge reference point of the tool held by the third tool holder (third tool) are distant to their respective offset sides from the machining position of the first tool, as compared with a case where the second and third tools are held by the conventional tool holders.

Thus, when the first tool is indexed to the machining position for machining, the second and third tools adjacent to the first tool at both sides of the first tool are positioned at positions distant from the workpiece, as compared with the case where the second third tools are held by the conventional tool holders. Therefore, a maximum allowable workpiece outer diameter for machining using the first tool is larger than in the case where the second and third tools are held by the conventional tool holders. That is, such implementation enables machining a workpiece having a larger diameter, which makes it possible to bring out inherent machining ability of the lathe, and thereby enables efficient operation of the lathe.

Furthermore, the lathe according to the present disclosure may be implemented such that:

the lathe further includes a Y'-axis feed mechanism moving the spindle and the turret relative to each other in a direction of a Y'-axis orthogonal to the Z-axis and intersecting with the X-axis non-perpendicularly;

the lathe is configured to move the spindle and the turret in a direction of a Y-axis orthogonal to both the X-axis and the Z-axis by combined operation of the X-axis feed mechanism and Y'-axis feed mechanism; and the tool holding part of the at least one of the tool holders holds the tool at a holding position thereon set at a position such that, when the held tool is indexed to the machining position by rotation of the turret, the cutting-edge reference point of the held tool is offset to a side opposite to the X-axis feed mechanism and the Y'-axis feed mechanism with respect to the X-Z plane including the center axis of the turret.

In the present disclosure, offsetting the position of the tool held by the tool holder to one side with respect to the X-Z plane including the center axis of the turret enables machining a workpiece having a larger diameter, without modifications to the components of the lathe. Further, such offsetting makes it possible to bring out inherent machining ability of the lathe, and thereby enables efficient operation of the lathe.

DETAILED DESCRIPTION

Hereinafter, a specific embodiment of the present disclosure will be described with reference to the drawings.

Figure 1:
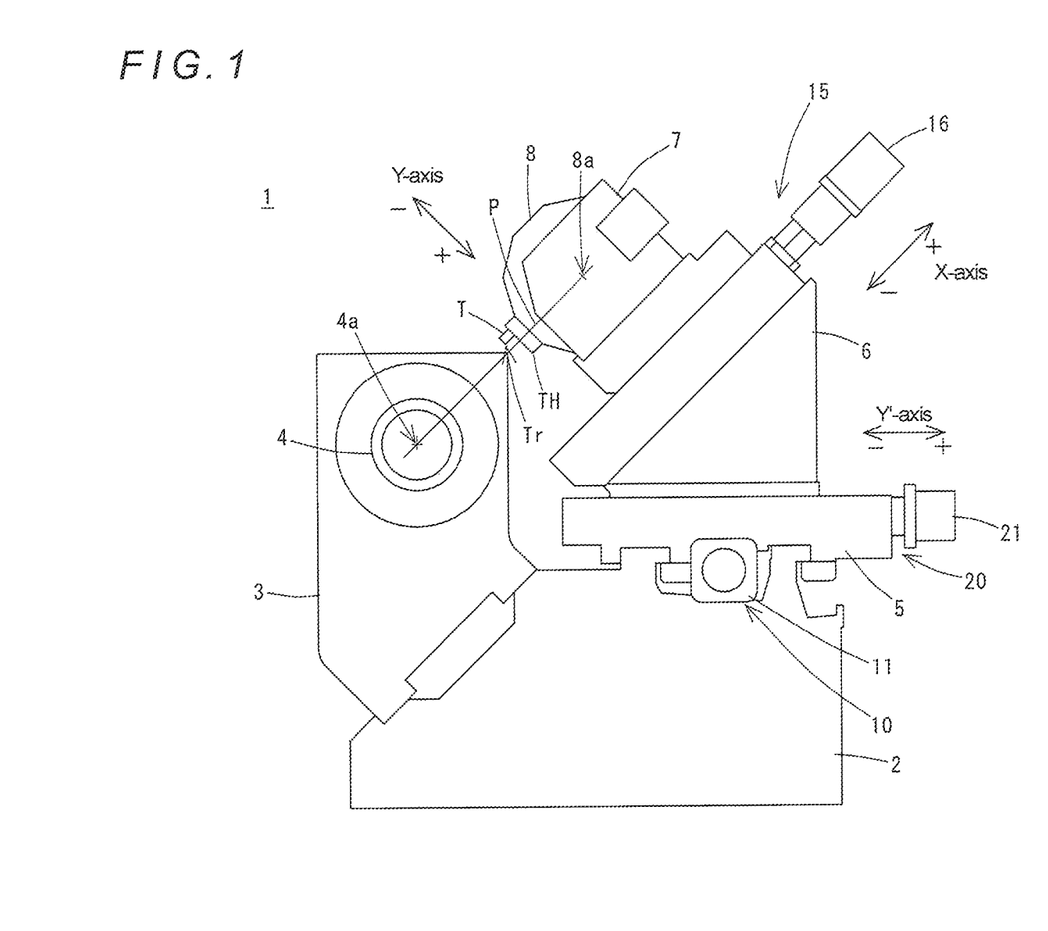
FIG. 1 is a side view of a lathe according to an embodiment of the present disclosure.

First of all, a lathe according to this embodiment is described. FIG. 1 is a side view of the lathe according to this embodiment. As shown in FIG. 1, the lathe 1 according to this embodiment includes a bed 2, a headstock 3 disposed on the bed 2, a carriage 5 disposed on the bed 2 such that it is movable in a direction of a Z-axis that is orthogonal to the surface of the sheet of paper containing FIG. 1, a saddle 6 disposed on the carriage 5 such that it is movable in a direction of a Y'-axis that is indicated by an arrow in FIG. 1, and a tool rest 7 disposed on the saddle 6 such that it is movable in a direction of an X-axis that is indicated by an arrow in FIG. 1.

The headstock 3 holds a spindle 4 such that the spindle 4 is rotatable about a center axis $4a$ thereof. Further, a chuck, not shown in the drawings, is attached to the spindle 4, and a workpiece (not shown) is held by the chuck. Note that the spindle 4 rotates about the center axis $4a$ thereof by being driven by a spindle motor, not shown in the drawings, that is incorporated in the headstock 3.

The carriage 5 is driven by a Z-axis feed mechanism 10 to move in the direction of the Z-axis, the Z-axis being a feed axis that is parallel to the center axis $4a$ of the spindle 4. The saddle 6 is driven by a Y'-axis feed mechanism 20 to move in the direction of the Y'-axis, the Y'-axis being a feed axis that is orthogonal to the Z-axis. The tool rest 7 holds a turret 8 such that the turret 8 is rotatable about a center axis $8a$ thereof that is parallel to the center axis $4a$ of the spindle 4. Further, the tool rest 7 is driven by an X-axis feed mechanism 15 to move in the direction of the X-axis, the X-axis being a feed axis that is orthogonal to the Z-axis and intersects with the Y'-axis non-perpendicularly.

The turret 8 is composed of a polygonal prismatic body, and tool holders TH, which each hold a tool T, are attached to outer peripheral surfaces and end surfaces corresponding thereto of the turret 8. The turret 8 is rotated about the center axis 8a thereof by an appropriate drive motor to index a tool T, which is attached radially to the turret 8, to a machining position that is determined for performing a machining action. Note that fixed tools, such as a cutting tool, and rotary tools, such as a drill and an end mill, can be attached to the turret 8.

The Z-axis feed mechanism 10 includes a Z-axis servo motor 11 provided on the bed 2, a Z-axis ball screw (not shown) connected to the Z-axis servo motor 11, and a ball nut (not shown) screwed on the Z-axis ball screw (not shown) and fixed to the carriage 5.

The Y'-axis feed mechanism 20 includes a Y'-axis servo motor 21 provided on the carriage 5, a Y'-axis ball screw (not shown) connected to the Y'-axis servo motor 21, and a ball nut (not shown) screwed on the Y'-axis ball screw (not shown) and fixed to the saddle 6.

The X-axis feed mechanism 15 includes an X-axis servo motor 16 provided on the saddle 6, an X-axis ball screw (not shown) connected to the X-axis servo motor 16, and a ball nut (not shown) screwed on the X-axis ball screw (not shown) and fixed to the tool rest 7.

Operations of the Z-axis servo motor 11, X-axis servo motor 16, Y'-axis servo motor 21, spindle motor, and drive motor for turret indexing are controlled by an appropriate controller (not shown).

In the lathe 1 having the above-described configuration, under control by the controller (not shown), the turret 8 is moved in the Z-axis direction along the center axis 4a of the spindle 4, the X-axis direction orthogonal to the Z-axis direction, and a Y-axis direction (composite Y-axis direction) orthogonal to both the Z-axis direction and the X-axis direction.

That is, under control by the controller (not shown), the turret 8 moves along the Z-axis when the Z-axis servo motor 11 is driven, and moves along the X-axis when the X-axis servo motor 16 is driven.

Further, under control by the controller (not shown), the turret 8 moves in the composite Y-axis direction orthogonal to both the Z-axis and the X-axis when the X-axis servo motor 16 and the Y'-axis servo motor 21 are driven synchronously. Specifically, when the saddle 6 is moved in the negative Y'-axis direction by the Y'-axis feed mechanism 20 and simultaneously the tool rest 7 is moved in the positive X-axis direction by the X-axis feed mechanism 15 in synchronization with the movement of the saddle 6, the turret 8 moves in the negative Y-axis direction. Conversely, when the saddle 6 is moved in the positive Y'-axis direction by the Y'-axis feed mechanism 20 and simultaneously the tool rest 7 is moved in the negative X-axis direction by the X-axis feed mechanism 15 in synchronization with the movement of the saddle 6, the turret 8 moves in the positive Y-axis direction.

Accordingly, in this lathe 1, in a state where the spindle 4 holds a workpiece and the turret 8 holds tools T as appropriate, turning can be performed on the workpiece by moving a tool T in an X-Z plane while rotating the workpiece. Further, so-called milling can be performed on the workpiece by moving a rotary tool held by the turret 8 in a three-dimensional space defined by the X-axis, the Y-axis, and the Z-axis with the workpiece stopped in rotation or while rotating the workpiece slowly.

Next, the tool holders TH attached to the turret 8 are described. As shown in FIG. 1, in this embodiment, at least one of the tool holders TH attached to the turret 8 holds a tool T with a tool holding part thereof at a holding position thereon which is set at a position such that, when the held tool T indexed to the machining position by rotation of the turret 8, a cutting-edge reference point Tr of the held tool T is offset to one side with respect to an X-Z plane P which includes the center axis 8a of the turret 8.

Note that the cutting-edge reference point Tr means a site on a tip of the tool T which performs a machining action. In a case of a fixed tool such as a cutting tool, the cutting-edge reference point thereof is a machining-action performing point on a cutting edge thereof. In a case of a rotary tool such as a drill or an end mill, the cutting-edge reference point thereof is a point of intersection of a center axis and a tip thereof. Further, in a case where two or more tools T are held by one tool holder TH, the tools T are held by the tool holder TH such that the cutting-edge reference points Tr of all of them are offset to the one side.

In FIG. 1, a cutting tool as a fixed tool is illustrated. In the case of such a fixed tool, the tool holding position of the tool holder TH can be offset by offsetting a reference surface for tool holding that is set on the tool holder TH to one side from the X-Z plane P. Further, a rotary tool can be attached to the turret 8; in the case of a rotary tool, the state where the cutting-edge reference point of the rotary tool is offset can be achieved in the manners shown in FIGS. 3 to 6, for example.

Figure 3:
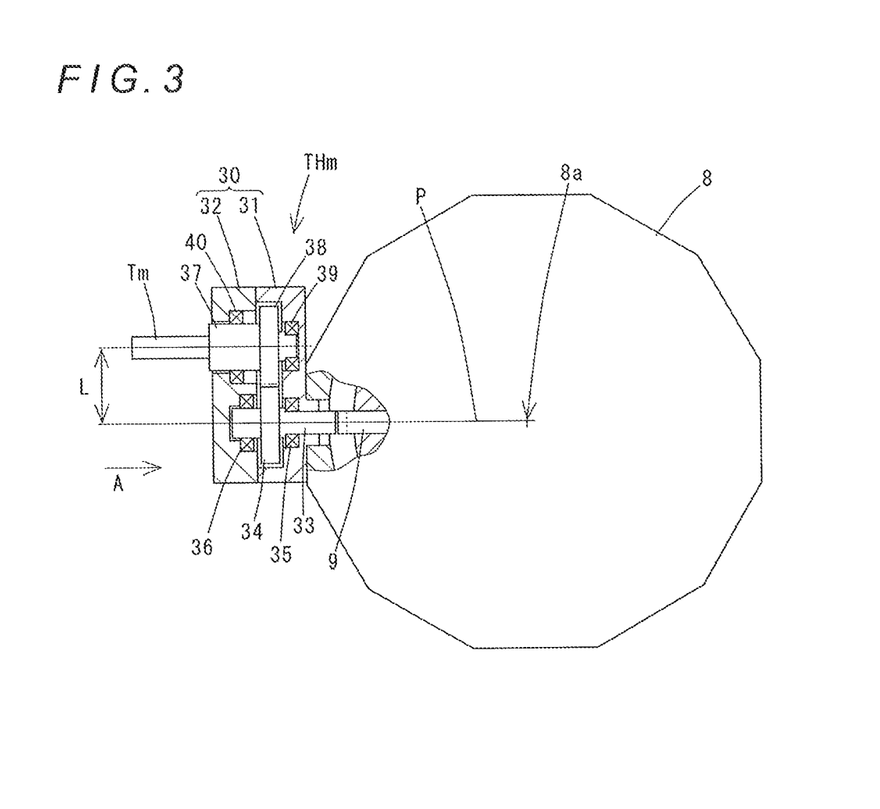
FIG. 3 shows a tool holder in the embodiment, partially in section.
Figure 4:
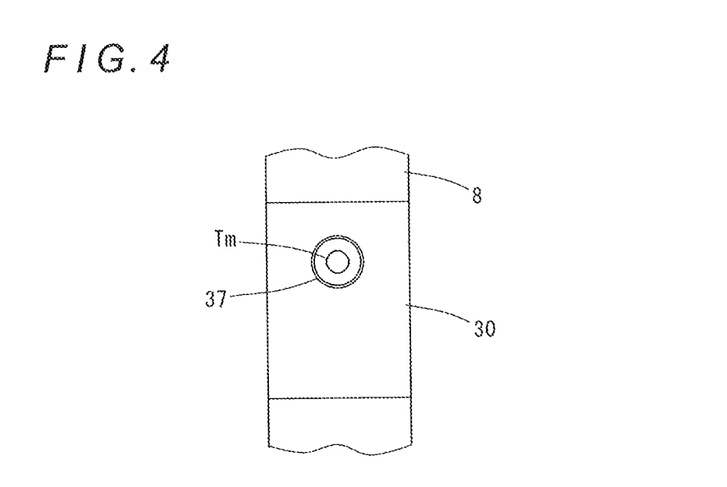
FIG. 4 is a view as viewed in the direction of arrow A in FIG. 3.
Figure 5:
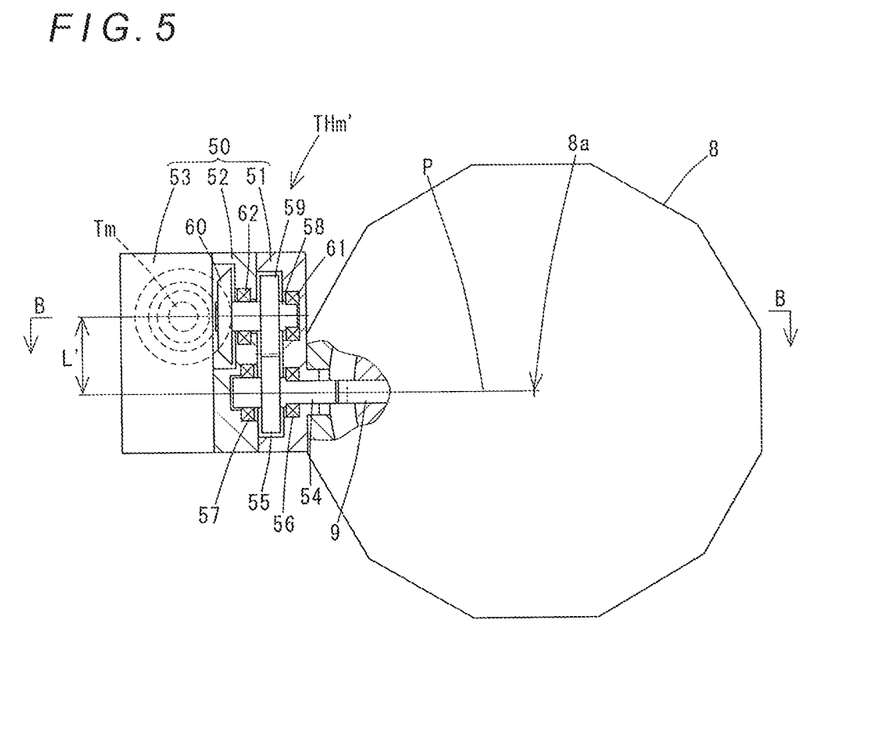
FIG. 5 shows a tool holder according to another embodiment, partially in section.
Figure 6:
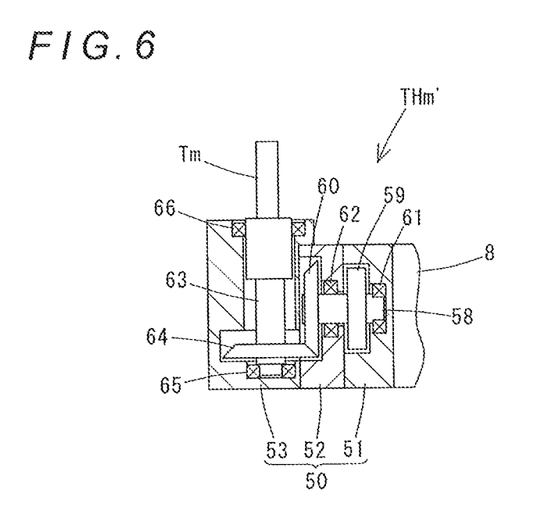
FIG. 6 is a cross section taken along line B-B in FIG. 5.

Note that, similarly to FIG. 1, FIGS. 3 and 5 are side views as viewed from the positive side of the Z-axis; however, the figures of FIGS. 3 and 5 have been rotated so that the X-Z plane P is shown horizontally, and are shown partially in section. The tool rest 7 is omitted from FIGS. 3 and 5. Further, FIG. 4 is a front view as viewed in the direction of arrow A in FIG. 3, and FIG. 6 is a sectional view taken along line B-B in FIG. 5.

The tool holder THm shown in FIGS. 3 and 4 holds a rotary tool Tm, such as an end mill, such that the rotary tool Tm extends along the X-axis when the tool holder THm is indexed to the machining position. The tool holder THm is composed of a body 30, a first rotary shaft 33, a second rotary shaft 37, and other components, the body 30 consisting of a first body 31 and a second body 32, and the first and second rotary shafts 33 and 37 being provided in the body 30.

The first rotary shaft 33 has a spur gear 34 and is arranged such that a center axis thereof is positioned in the X-Z plane P and becomes parallel to the X-axis when the tool holder THm is indexed to the machining position, and the first rotary shaft 33 is rotatably supported by bearings 35, 36. Further, when the tool holder THm is indexed to the machining position, an end of the first rotary shaft 33 is connected to a drive shaft 9 that is incorporated in the turret 8, which allows the first rotary shaft 33 to rotate together with the drive shaft 9.

The second rotary shaft 37 has a spur gear 38 that meshes with the spur gear 34, and is arranged parallel to the first rotary shaft 33 at a position offset to one side from the first rotary shaft 33, and the second rotary shaft 37 is rotatably supported by bearings 39, 40. When the tool holder THm is positioned at the machining position, an end portion of the second rotary shaft 37 located on the spindle 4 side is exposed toward the spindle 4 through the body 30. The end portion has an attachment hole formed therein which opens to the spindle 4 side, and the rotary tool Tm is attached to the attachment hole.

Accordingly, with this tool holder THm, a rotational force of the drive shaft 9 is transmitted to the second rotary shaft 37 through the meshing between the spur gears 34 and 38, which causes the rotary tool Tm attached to the second rotary shaft 37 to rotate together with the second rotary shaft 37. Further, the rotary tool Tm is attached to the turret 8 in a state of being offset by a distance L to one side from the X-Z plane P.

On the other hand, the tool holder THm' shown in FIGS. 5 and 6 holds a rotary tool Tm, such as an end mill, such that the rotary tool Tm extends along the Z-axis when the tool holder THm' is indexed to the machining position. The tool holder THm' is composed of a body 50, a first rotary shaft 54, a second rotary shaft 58, a third rotary shaft 63, and other components, the body 50 consisting of a first body 51, a second body 52, and a third body 53, and the first, second, and third rotary shafts 54, 58, and 63 being provided in the body 50.

The first rotary shaft 54 has a spur gear 55 and is arranged such that a center axis thereof is positioned in the X-Z plane P and becomes parallel to the X-axis when the tool holder THm' is indexed to the machining position, and the first rotary shaft 54 is rotatably supported by bearings 56, 57. Further, when the tool holder THm' is indexed to the machining position, an end of the first rotary shaft 54 is connected to the drive shaft 9 that is incorporated in the turret 8, which allows the first rotary shaft 54 to rotate together with the drive shaft 9.

The second rotary shaft 58 has a spur gear 59 and a bevel gear 60, the spur gear 59 meshing with the spur gear 55. The second rotary shaft 58 is arranged parallel to the first rotary shaft 54 at a position offset to one side from the first rotary shaft 54, and rotatably supported by bearings 61, 62.

The third rotary shaft 63 is arranged perpendicularly to the second rotary shaft 58, that is, parallel to the Z-axis, and arranged such that an end portion thereof located on the spindle 4 side is exposed toward the spindle 4 through the body 50 when the tool holder THm' is positioned at the machining position. The end portion has an attachment hole formed therein which opens to the spindle 4 side, and the rotary tool Tm is attached to the attachment hole. Further, the third rotary shaft 63 has a bevel gear 64 that meshes with the bevel gear 60, and is rotatably supported by bearings 65, 66.

Accordingly, with this tool holder THm', a rotational force of the drive shaft 9 is transmitted to the third rotary shaft 63 through the meshing between the spur gears 55 and 59 and the meshing between the bevel gears 60 and 64, which causes the rotary tool Tm attached to the third rotary shaft 63 to rotate together with the third rotary shaft 63. Further, the rotary tool Tm is attached to the turret 8 in a state of being offset by a distance L' to one side from the X-Z plane P.

Next, a machining manner using the tool holder TH that has the offset tool holding position is described.

The lathe 1 according to this embodiment having the above-described configuration can perform machining using the tool holder TH as shown in FIG. 1. The tool holder TH holds a tool T such that the cutting-edge reference point Tr of the tool T is offset to a side opposite to the X-axis feed mechanism 5 and the Y'-axis feed mechanism 20, that is, to the negative side of the Y-axis, with respect to the X-Z plane P including the center axis 8a of the turret 8. Note that the tool T is a cutting tool for outer diameter machining.

Figure 2:
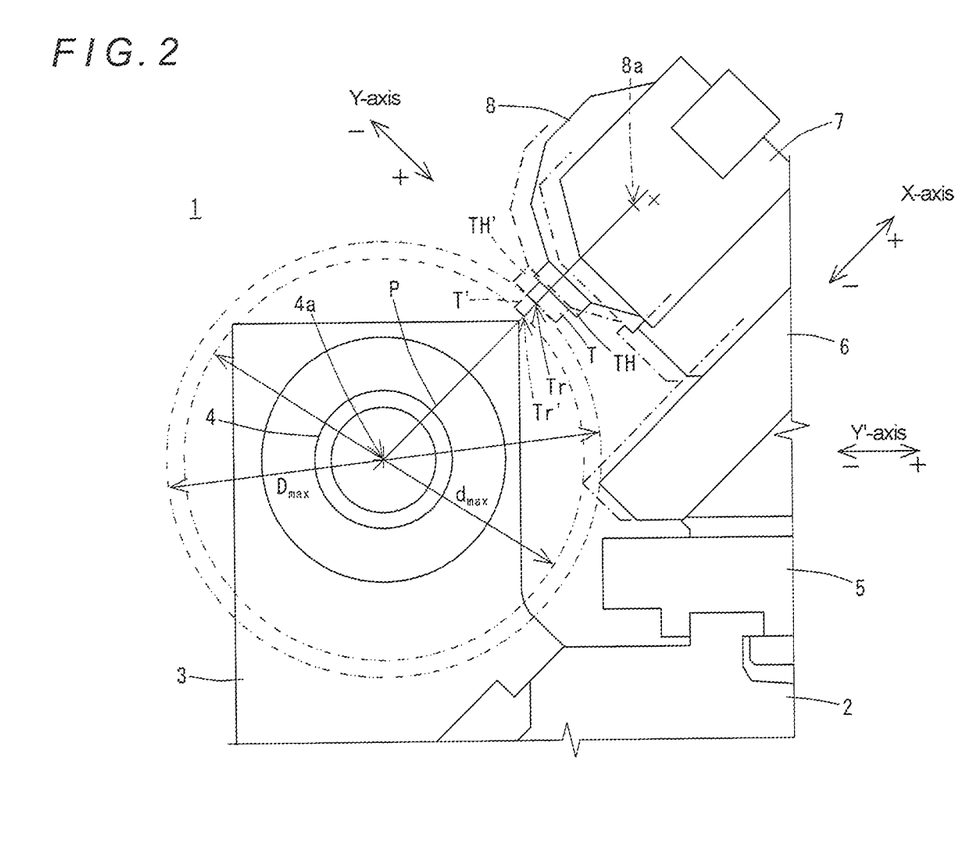
FIG. 2 is an illustration for explaining an effect achieved by the lathe according to the embodiment.

As shown in FIG. 2, using the tool T offset to the negative side of the Y-axis enables machining a workpiece having a larger diameter, as compared with a case of using a tool T' held by the conventional tool holder TH'. In FIG. 2, the state where the tool T is held by the tool holder TH in the state of being offset to the negative side of the Y-axis is illustrated by solid lines, and the state where the tool T' is held by the conventional tool holder TH', that is, held such that the cutting-edge reference point Tr' thereof is positioned in the X-Z plane P including the center axis 8a of the turret 8 is illustrated by dashed dotted lines.

As shown in FIG. 2, a maximum allowable workpiece outer diameter $D_{max}$ for machining using the tool T and a maximum allowable workpiece outer diameter $d_{max}$ for machining using the tool T' are respectively determined based on interference relationship between the tool T, T' and the saddle 6. The maximum allowable workpiece outer diameter $D_{max}$ for machining using the tool T offset to the negative side of the Y-axis is larger than the maximum allowable workpiece outer diameter $d_{max}$ for machining using the conventional tool T' that is not offset.

The reason therefor is as follows. That is, machining a workpiece using the tool T offset to the negative side of the Y-axis requires moving the tool T in the positive Y-axis direction to position the cutting-edge reference point Tr of the tool T within the X-Z plane P that is the machining position. Therefore, it is necessary to move the saddle 6 in the positive Y'-axis direction and move the tool rest 7 in the negative X-axis direction. Moving the saddle 6 in the positive Y'-axis direction for machining, that is, moving the saddle 6 away from the spindle 4 for machining, expands the space between the spindle 4 and the saddle 6, which enables machining a workpiece having a larger diameter.

Figure 7:
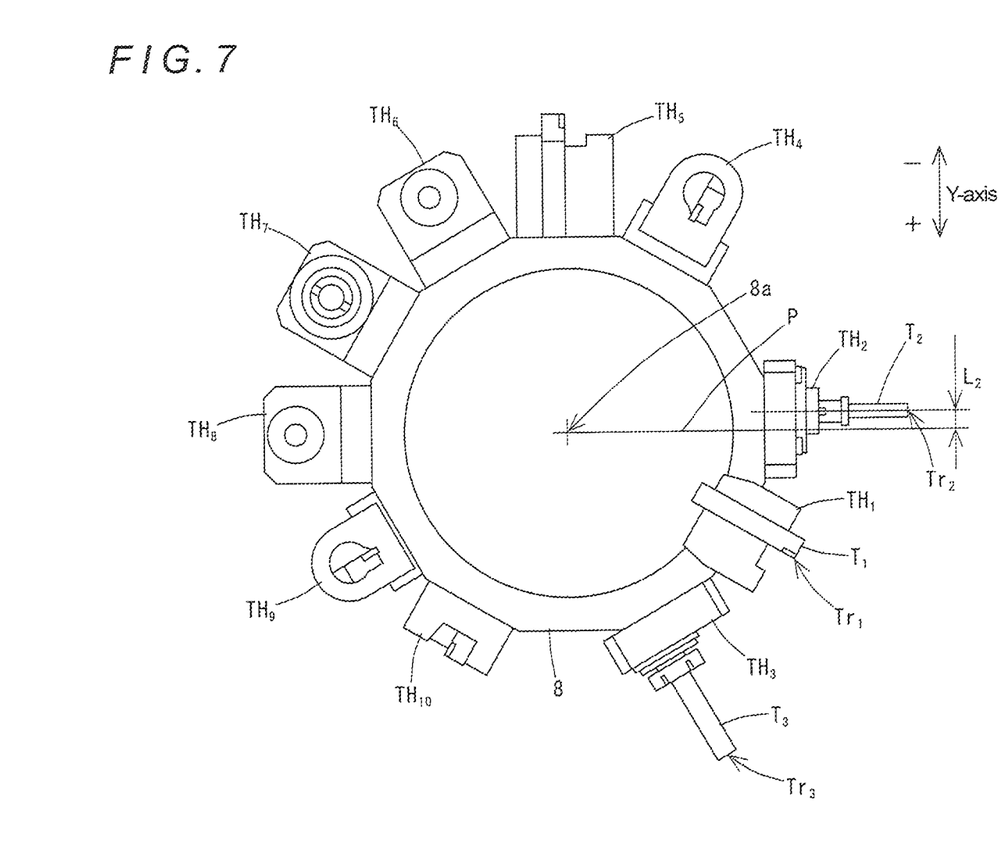
FIG. 7 shows a state of tool holders being attached to a turret in the embodiment.
Figure 8:
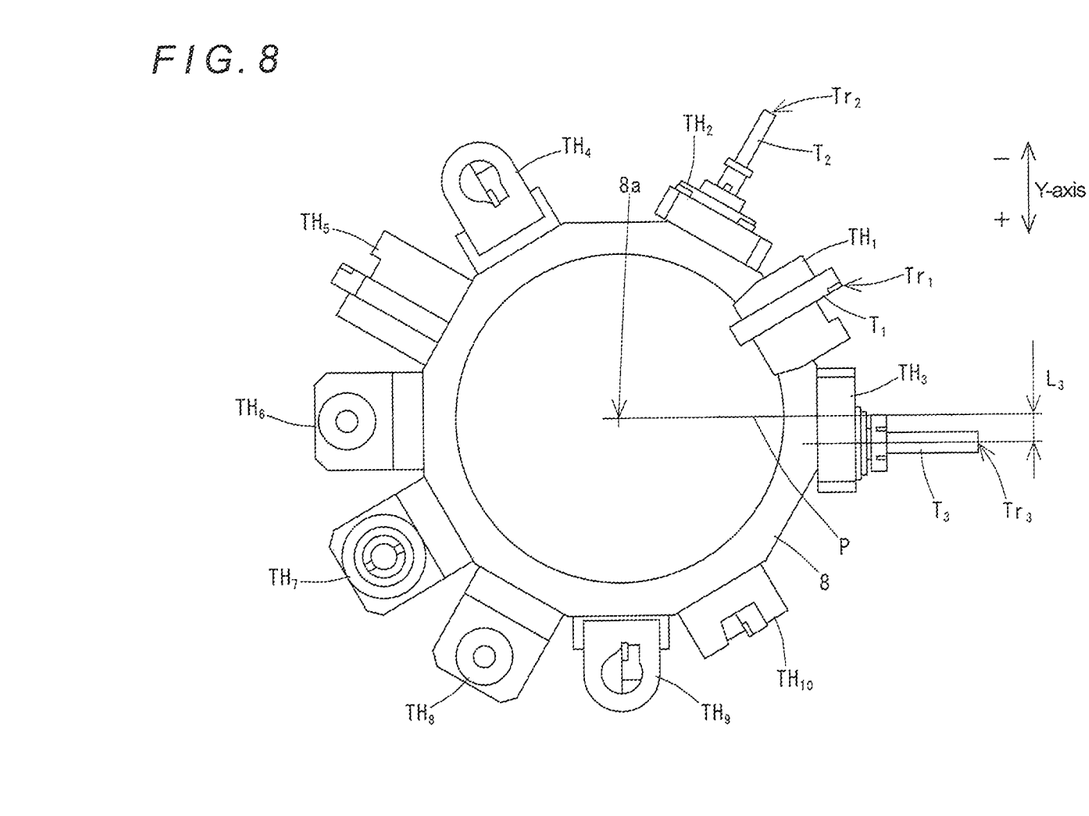
FIG. 8 shows a state of the tool holders being attached to the turret in the embodiment.
Figure 9:
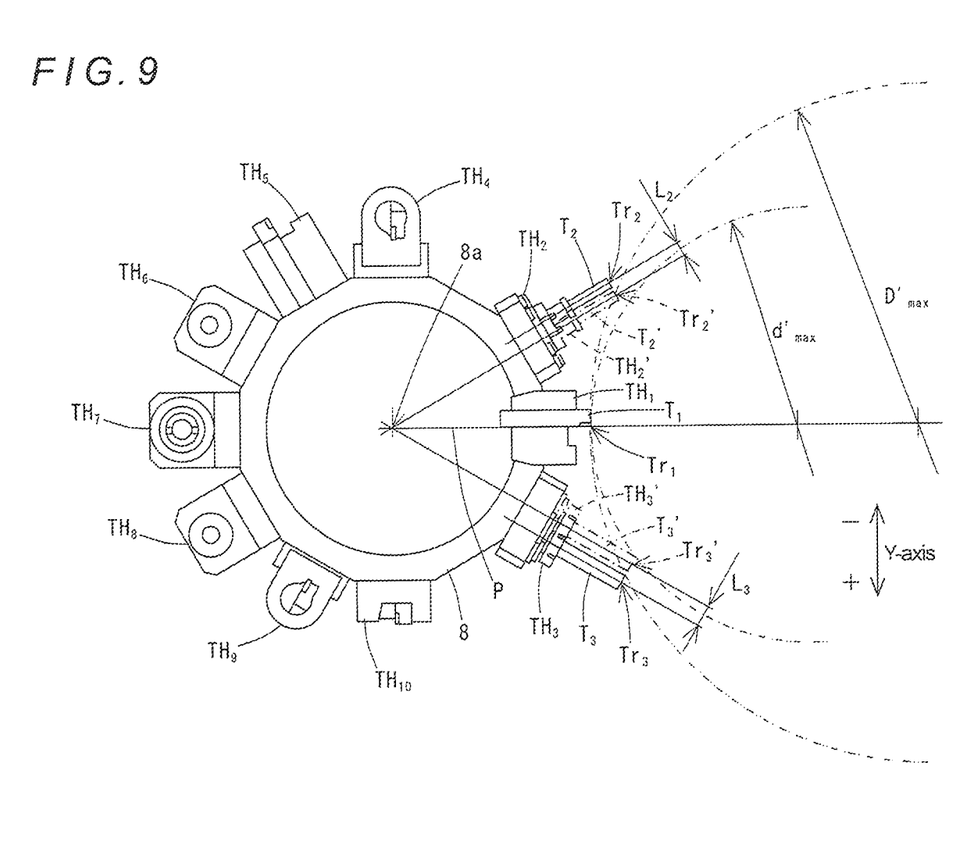
FIG. 9 is an illustration for explaining an effect achieved by the lathe according to the embodiment.

Further, in the lathe 1 according to this embodiment, as shown in FIGS. 7 to 9, a first tool holder $TH_1$ is attached to the turret 8 and a second tool holder $TH_2$ and a third tool holder $TH_3$ are attached to the turret 8 adjacently to the first tool holder $TH_1$ respectively at both sides of the first tool holder $TH_1$. Further, as shown in the figures, other appropriate tool holders $TH_4$ to $TH_{10}$ are also attached to the turret 8. Note that FIGS. 7 to 9 show views as viewed in the positive Z-axis direction from the spindle 4 side.

The first tool holder $TH_1$ holds a tool $T_1$, which is a cutting tool for outer diameter machining, such that a cutting-edge reference point $Tr_1$ of the tool $T_1$ is positioned in the X-Z plane P including the center axis 8a of the turret 8 when the tool $T_1$ is indexed to the machining position. Further, as shown in FIG. 7, the second tool holder $TH_2$ holds a tool $T_2$, which is a rotary tool, such that a cutting-edge reference point $Tr_2$ of the tool $T_2$ is offset by a distance $L_2$ in the negative Y-axis direction from the X-Z plane P, in other words, in a direction away from the first tool $T_1$, when the tool $T_2$ is indexed to the machining position. Furthermore, as shown in FIG. 8, the third tool holder $TH_3$ holds a tool $T_3$, which is also a rotary tool, such that a cutting-edge reference point $Tr_3$ of the tool $T_3$ is offset by a distance $L_3$ in the positive Y-axis direction from the X-Z plane P, in other words, in a direction away from the tool $T_1$, when the tool $T_3$ is indexed to the machining position.

In the thus-implemented lathe 1, as shown in FIG. 9, when the tool $T_1$ held by the tool holder $TH_1$ (first tool) is indexed to the machining position, the tool $T_2$ held by the second tool $TH_2$ (second tool) and the tool $T_3$ held by the third tool holder $TH_3$ (third tool) are positioned such that the cutting-edge reference points $Tr_2$ and $Tr_3$ thereof are distant in their respective offset directions from the machining position of the first tool $T_1$, as compared with a case where the second and third tools $T_2$ and $T_3$ are held by the conventional tool holders. In FIG. 9, the state where the second tool $T_2$ and the third tool $T_3$ are respectively held in the offset state by the second tool holder $TH_2$ and the third tool holder $TH_3$ is illustrated by solid lines, and a state where a second tool $T_2'$ and a third tool $T_3'$ are respectively held by a second holder $TH_2'$ and a third tool holder $TH_3'$ which have the conventional configuration, that is, held such that a cutting-edge reference point $Tr_2'$, $Tr_3'$ thereof is positioned in the X-Z plane P, is illustrated by dashed dotted lines.

Thus, when the first tool $T_1$ is indexed to the machining position for machining, the second and third tools $T_2$ and $T_3$ adjacent to the first tool $T_1$ at both sides of the first tool $T_1$ are more distant from the first tool $T_1$ than the second and third tools $T_2'$ and $T_3'$ held by the second and third tool holders $TH_2'$ and $TH_3'$ having the conventional configuration. Therefore, a maximum allowable workpiece outer diameter for machining using the first tool $T_1$ is larger than in the case where the second and third tool holders $TH_2'$ and $TH_3'$ having the conventional configuration are used.

As shown in FIG. 9, the maximum allowable workpiece outer diameter for machining using the first tool $T_1$ is determined based on interference relationship between the workpiece and the second and third tools $T_2$ and $T_3$; therefore, a maximum allowable workpiece outer diameter $D'_{max}$ in the case of the second and third tools $T_2$ and $T_3$ offset to be distant from the first tool $T_1$ is larger than a maximum allowable workpiece outer diameter $d'_{max}$ in the case of the second and third tools $T_2'$ and $T_3'$ held by the second and third tool holders $TH_2'$ and $TH_3'$ having the conventional configuration.

Thus, using the second tool holder $TH_2$ and the third tool holder $TH_3$ enables machining a workpiece having a larger diameter, which makes it possible to bring out inherent machining ability of the lathe 1, and thereby enables efficient operation of the lathe 1.

Hereinbefore, a specific embodiment of the present disclosure has been described. However, the present disclosure is not limited thereto and can be implemented in other manners.

For example, although the lathe 1 in the above embodiment is configured to provide feeding in the Y-axis direction by combining feeding in the Y'-axis direction with feeding in the X-axis direction, the prevent disclosure is not limited to such a configuration and the lathe 1 may be configured to feed the turret 8 directly in the Y-axis direction by providing a Y-axis feed mechanism thereon. Further, if feeding in the Y-axis direction is not needed, it is not necessary to provide a feed mechanism with respect to the Y-axis.

Further, as a matter of course, the number of tool holders provided for holding tools in the offset manner is not limited to the above-mentioned number; an appropriate number of tool holders can be attached to the lathe.

Further, although the above embodiment employs, as an example, a specially designed tool holder for holding a tool in the offset manner, the present disclosure is not limited thereto and a configuration is possible in which the conventionally configured tool holder is used and the position of attachment of the tool holder to the turret is changed so as to attach the tool holder to the turret such that a cutting-edge reference point of the held tool is offset to one side with respect to the X-Z plane including the center axis of the turret.

What is claimed is:

1. A lathe, comprising:
a spindle;
a turret;
a Z-axis feed mechanism moving the spindle and the turret relative to each other in a direction of a Z-axis extending along a center axis of the spindle;
an X-axis feed mechanism moving the spindle and the turret relative to each other in a direction of an X-axis orthogonal to the Z-axis;
a Y'-axis feed mechanism moving the spindle and the turret relative to each other in a direction of a Y'-axis orthogonal to the Z-axis and intersecting with the X-axis non-perpendicularly; and
a plurality of tool holders each having a tool holding part holding a tool, and attached to the turret,
the lathe being configured to move the spindle and the turret in a direction of a Y-axis orthogonal to both the X-axis and the Z-axis by combined operation of the X-axis feed mechanism and Y'-axis feed mechanism,
at least one of the plurality of tool holders having a single tool holding part holding the tool, the single tool holding part holding the tool at a holding position thereon set at a position such that, when the held tool is indexed to the machining position by rotation of the turret, a cutting-edge reference point of the held tool is offset to a side opposite to the X-axis feed mechanism and the Y'-axis feed mechanism with respect to a plane which includes the center axis of the spindle and a center axis of the turret and is parallel to the X-axis and the Z-axis.

* * * * *